US010350857B2

(12) United States Patent
Naritomi et al.

(10) Patent No.: US 10,350,857 B2
(45) Date of Patent: Jul. 16, 2019

(54) TITANIUM ALLOY COMPOSITE AND BONDING METHOD THEREOF

(75) Inventors: Masanori Naritomi, Tokyo (JP); Naoki Ando, Tokyo (JP)

(73) Assignee: TAISEI PLAS CO., LTD., Tokyo (JP)

(*) Notice: Subject to any disclaimer, the term of this patent is extended or adjusted under 35 U.S.C. 154(b) by 1200 days.

(21) Appl. No.: 12/595,774

(22) PCT Filed: Apr. 11, 2008

(86) PCT No.: PCT/JP2008/057131
§ 371 (c)(1),
(2), (4) Date: Oct. 13, 2009

(87) PCT Pub. No.: WO2008/133030
PCT Pub. Date: Nov. 6, 2008

(65) Prior Publication Data
US 2010/0151200 A1   Jun. 17, 2010

(30) Foreign Application Priority Data
Apr. 13, 2007 (JP) ................................. 2007-106455

(51) Int. Cl.
*B32B 15/08* (2006.01)
*B32B 15/14* (2006.01)
(Continued)

(52) U.S. Cl.
CPC .............. *B32B 15/08* (2013.01); *B32B 5/147* (2013.01); *B32B 15/06* (2013.01); *B32B 15/092* (2013.01);
(Continued)

(58) Field of Classification Search
CPC ......... B32B 15/08; B32B 27/38; C09J 163/00
(Continued)

(56) References Cited

U.S. PATENT DOCUMENTS 3,853,690 A * 12/1974 McGarry et al. ............. 428/416
3,959,091 A *  5/1976 Moji ...................... C25D 11/26
                                                    205/200
(Continued)

FOREIGN PATENT DOCUMENTS

EP       1679391 A1 *  7/2006 ............... B32B 7/12
JP       9-314744 A     12/1997
(Continued)

OTHER PUBLICATIONS

"Wrought Titanium and Titanium Alloys; Properties and Selection: Nonferrous Alloys and Special-Purpose Materials," Published 1990, obtained May 17, 2012, ASM Handbook, vol. 2, ASM International, pp. 592-633, http://products.asminternational.org/hbk/do/highlight/content/V02/D01/A25/s0026726.htm.*

(Continued)

*Primary Examiner* — Monique R Jackson
(74) *Attorney, Agent, or Firm* — Westerman, Hattori, Daniels & Adrian, LLP

(57) ABSTRACT

An object of the present invention is to create, from a titanium alloy and an FRP prepreg, a composite of a titanium alloy and an FRP material that is suitable for bolt fastening. The composite can bring out excellent characteristics in CFRP members in mobile electronic-electric devices, mobile equipment, medical instruments, marine devices and the like. It has been found that titanium alloy having a special constant surface shape adheres strongly with an epoxy adhesive. In a composite obtained using this technique to integrate a titanium alloy member as a cover material and a CFRP material, the metal alloy portion deforms and disperses locally strong forces so that the CFRP material is not damaged, even when the composite is assembled to another metal member through bolt-fastening. As a result, the composite is expected to be effective for applications in mobile equipment or mobile device casings, (Continued)

where lightweightness, corrosion resistance, toughness and ease of assembly are required.

6 Claims, 6 Drawing Sheets

(51) Int. Cl.
| | |
|---|---|
| B32B 27/38 | (2006.01) |
| C09J 163/00 | (2006.01) |
| B32B 5/14 | (2006.01) |
| B32B 15/092 | (2006.01) |
| B32B 15/06 | (2006.01) |
| B32B 27/20 | (2006.01) |
| B32B 27/28 | (2006.01) |
| B32B 27/32 | (2006.01) |

(52) U.S. Cl.
CPC ............. *B32B 15/14* (2013.01); *B32B 27/20* (2013.01); *B32B 27/285* (2013.01); *B32B 27/286* (2013.01); *B32B 27/32* (2013.01); *B32B 27/38* (2013.01); *C09J 163/00* (2013.01); *B32B 2262/0269* (2013.01); *B32B 2262/101* (2013.01); *B32B 2262/106* (2013.01); *B32B 2264/101* (2013.01); *B32B 2264/102* (2013.01); *B32B 2264/104* (2013.01); *B32B 2307/714* (2013.01); *Y10T 428/24355* (2015.01); *Y10T 428/24405* (2015.01)

(58) Field of Classification Search
USPC .......................................... 428/323, 327, 416
See application file for complete search history.

(56) References Cited

U.S. PATENT DOCUMENTS

| | | | | |
|---|---|---|---|---|
| 3,989,876 | A * | 11/1976 | Moji ...................... | C25D 11/26 205/200 |
| 4,314,876 | A * | 2/1982 | Kremer ..................... | C23F 1/26 216/108 |
| 4,473,446 | A * | 9/1984 | Locke ..................... | C25D 11/26 205/212 |
| 4,846,905 | A * | 7/1989 | Tarbutton ............... | C08G 59/62 525/119 |
| 5,100,500 | A * | 3/1992 | Dastolfo ................... | C23F 1/26 216/100 |
| 5,866,272 | A * | 2/1999 | Westre ...................... | B32B 3/12 428/593 |
| 6,254,954 | B1 * | 7/2001 | Bennett et al. .............. | 428/41.8 |
| 6,776,918 | B1 | 8/2004 | Yoshikawa et al. | |
| 8,802,224 | B2 * | 8/2014 | Herrmann ............. | B29C 70/088 428/215 |
| 8,932,719 | B2 * | 1/2015 | Naritomi ................... | B32B 7/12 148/275 |
| 2004/0062943 | A1 | 4/2004 | Naritomi et al. | |
| 2005/0048246 | A1 * | 3/2005 | Westre ..................... | B32B 3/14 428/57 |
| 2006/0127684 | A1 | 6/2006 | Naritomi et al. | |
| 2008/0127479 | A1 | 6/2008 | Naritomi et al. | |

FOREIGN PATENT DOCUMENTS

| | | | |
|---|---|---|---|
| JP | 2000-351173 | A | 12/2000 |
| JP | 2002-120002 | A | 4/2002 |
| JP | 2003-246849 | A | 9/2003 |
| JP | 2004-43850 | A | 2/2004 |
| JP | 2004-195493 | A | 7/2004 |
| JP | 2004-216609 | A | 8/2004 |
| JP | 2005306026 | A * | 11/2005 |
| JP | 2007-50630 | A | 3/2007 |
| WO | 03/064150 | A1 | 8/2003 |
| WO | 2004/041532 | A1 | 5/2004 |
| WO | 2007/040245 | A1 | 4/2007 |
| WO | 2008/047811 | A1 | 4/2008 |
| WO | 2008/069252 | A1 | 6/2008 |
| WO | 2008/078714 | A1 | 7/2008 |
| WO | 2008/081933 | A1 | 7/2008 |

OTHER PUBLICATIONS

"Acrylonitrile-Butadiene Rubber (NBR)," obtained May 18, 2012, International Institute of Synthetic Rubber Producers, Inc., www.iisrp.com/webpolymers/07nbr-18feb2002.pdf.*
English Machine Translation of JP2003-246849, obtained from JPO on May 18, 2012.*
English Machine Translation of JP2007-050630, obtained from JPO on May 15, 2012.*
"Paraloid BTA 731," obtained Aug. 3, 2016, Rohm and Haas, http://www.dow.com/assets/attachments/business/plastics_additives/paraloid_bta/paraloid_bta-731/tds/paraloid_bta-731.pdf.*
"Particle Size Conversion Table," obtained Aug. 3, 2016, Sigma-Aldrich, http://www.sigmaaldrich.com/chemistry/stockroom-reagents/learning-center/technical-library/particle-size-conversion.printerview.html.*
CEMEDINE, Epoxy Resin Adhesive, product information downloaded from www.cemedine.co.jp/e/product/epoxy.html on Mar. 3, 2018.*
Ammonium bifluoride, Wikipedia, The Free Encyclopedia, downloaded from en.wikipedia.org on Mar. 3, 2018.*
Henkel, HYSOL(RTM) EA 9628 Epoxy Film Adhesive, Material Data Sheet, Jan. 2001.*
MSDS, Henkel, HYSOL(RTM) EA 9202 Epoxy Primer, MSDS date Aug. 17, 1988, downloaded from hazard.com on Mar. 3, 2018.*
Henkel, Product Selector Guide for the Aerospace Industry, Nov. 2005.*
CYTEC (formerly American Cyanamid), BR (RTM) 127 Corrosion Inhibiting Primer, Technical Data Sheet, Aug. 2010.*
Ditchek, Bondability of Ti Adherends, unclassified report prepared for Naval Air Systems Command, available to the public May 1982, downloaded from dtic.mil.*
CYTEC (formerly American Cyanamid), FM (RTM) 300 Epoxy Film Adhesive, Technical Data Sheet, Oct. 2013.*
MSDS, American Cyanamid, FM300K Adhesive Films, MSDS date Jul. 4, 1992, downloaded from hazard.com on Mar. 3, 2018.*
EPO Machine translation of JP2005-306026A, published Nov. 4, 2005.*
Roche, Surface Characterization of Chemically Treated Titanium and Titanium Alloys, unclassified report prepared for Air Force Systems Command, available to the public May 1980, downloaded from dtic.mil.*
Critchlow (Review of surface pretreatments for titanium alloys), Int. J. Adhesion and Adhesives 15 (1995), pp. 161-172.*
Molitor, Adhesives bonding of titanium alloy to a glass fibre reinforced composite material, International Journal of Adhesion & Adhesives 22 (2002) pp. 101-107.*
Molitor, Surface treatment of titanium for adhesive bonding to polymer composites: a review, International Journal of Adhesion & Adhesives 21 (2001) pp. 129-136.*
International Search Report of PCT/JP2008/057131, dated Jul. 8, 2008.

* cited by examiner

DEVICE: JSM 7401F
ACCELERATION VOLTAGE(kV): 2.0
MAGNIFICATIONS x10000
IMAGE: LEI
<LOWER DETECTOR>
MEASUREMENT DATE: 2007/01/17

DEVICE: JSM 7401F
ACCELERATION VOLTAGE(kV): 2.0
MAGNIFICATIONS x100000
IMAGE: SEI
<SECONDARY ELECTRON IMAGE>
MEASUREMENT DATE: 2007/01/19

TITANIUM ALLOY COMPOSITE AND BONDING METHOD THEREOF

TECHNICAL FIELD

The present invention relates to a composite of, for instance, a titanium alloy and a titanium alloy, a titanium alloy and another metal alloy, or a titanium alloy and a fiber-reinforced plastic, as used in industrial machinery such as transport equipment, electric equipment, medical equipment or general machinery, as well as in consumer appliances. The invention relates also to a bonding method of such a composite. More specifically, the present invention relates to a titanium alloy composite and to a bonding method thereof, the titanium alloy composite resulting from integrally bonding (fixing) an optimal titanium alloy part and a fiber-reinforced plastic such as carbon fiber-reinforced plastic, in components that make up, for instance, transport equipment where lightweight is required, such as automotive components, aircraft components, and bicycle components.

BACKGROUND ART

Technologies for integrating metals with metals, and metals with resins, are required in components in various industrial fields such as automobiles, domestic appliances, industrial machinery or the like, and are likewise required in the design and manufacture of structures. Numerous adhesives have been developed to meet these requirements, among which various excellent commercially available adhesives are in commercial use. For instance, adhesives that bring out their functionality at normal temperature, or upon heating, are used to integrally bond a metal and a synthetic resin. This method constitutes a standard bonding technique used at present.

Meanwhile, other bonding technologies that do not rely on adhesives have also been developed. Examples of such technologies include, for instance, methods for integrating light metals, such as magnesium, aluminum or alloys thereof, or ferrous alloys such as stainless steel, with high-strength engineering resins, without any intervening adhesive. Manufacturing technologies that have been developed and proposed include, for instance, methods that involve bonding simultaneously with injection or the like (hereafter, "injection bonding"), wherein a polybutylene terephthalate resin (hereafter, "PBT") or a polyphenylene sulfide resin (hereafter, "PPS") is injected and bonded with an aluminum alloy (for instance, Patent documents 1 and 2). In addition, the possibility of using these resins systems in injection bonding of magnesium alloys, copper alloys, titanium alloys and stainless steel has recently been demonstrated and proposed (Patent documents 3, 4, 5 and 6).

These inventions, all of which stem from the same inventors, derive from a simple bonding (fixing) theory, namely an "NMT" theoretical hypothesis relating to injection bonding of aluminum alloys, and a "new NMT" theoretical hypothesis relating to injection bonding of all metal alloys. The theoretical hypothesis "new NMT", having a wider reach, and advanced by one of the inventors (Ando), posits the following. To bring out the strong bonding strength of injection bonding, it is necessary that both the metal alloy and the injection resin meet several conditions. Among these, the metal must meet the three conditions below. In condition (1), the chemically etched metal alloy has preferably a rough surface (surface roughness) exhibiting a period of 1 to 10 μm (spacing between peaks or spacing between valleys) wherein the peak-valley height difference is about half the spacing, i.e. about 0.5 to 5 μm.

Such roughness (surface roughness) cannot be totally achieved in practice through chemical reactions. Condition (1) is deemed to be satisfied when surface roughness, as measured using a surface roughness analyzer, yields a roughness curve with a maximum height difference ranging from 0.2 to 5 μm for textures of irregular period ranging from 0.2 to 20 μm, or when the mean width of elements (roughness curve average length) (RSm) ranges from 0.8 to 10 μm and the maximum height roughness (maximum height of profile) (Rz) ranges from 0.2 to 5 μm in accordance with Japanese Industrial Standards (JIS B 0601:2001(ISO 4287)), based on scanning analysis using a scanning probe microscope. The inventors denominate a roughness thus defined as "surface of micron-scale roughness". As condition (2), the above large irregular surface, strictly speaking the inner wall face of the recesses thereof, has a fine irregular surface of a period not smaller than 10 nm, preferably a period of 50 nm. As the last condition (3), the surface that constitutes the above fine irregular surface is a ceramic substance, specifically a metal oxide layer thicker than a native oxide layer, or a deliberately created metal phosphate layer. This hard-substance layer, moreover, is preferably a thin layer having a thickness ranging from several nm to several tens of nm.

As regards the resin conditions, suitable resins that can be used are hard crystalline resins having a slow crystallization rate upon rapid cooling, for instance through compounding with other polymers that are appropriate for the resin. In practice there can be used resin compositions in which a crystalline resin such as PBT or PPS is compounded with other appropriate polymers, as well as with glass fibers and the like. These resin compositions can be injection-bonded using ordinary injection molding machines and injection molding molds. The injection bonding process is explained next according to the "new NMT" hypothesis of the inventors. The injected molten resin is generally led into an injection molding mold at a temperature lower than the melting point of the resin by about 150° C. The molten resin is found to cool within flow channels of the molten resin, such as sprues, runners and the like, down to a temperature lower than the melting point. It will be appreciated that no immediate phase change to solid occurs in zero time, through crystallization when the molten crystalline resin is cooled rapidly, even at or below the melting point of the molten resin.

In effect, the molten resin persists in a molten, super-cooled state for a very short time also at or below the melting point. The duration of this supercooling has been successfully prolonged somewhat in PBT and PPS through some special compounding, as described above. This phenomenon can be exploited to cause the molten resin to penetrate into large, micron-scale recesses on the surface of the metal, before the abrupt rise in viscosity that accompanies the generation of large amounts of micro-crystals. After having penetrated into the recesses, the molten resin goes on cooling, whereby the number of micro-crystals increases dramatically, causing viscosity to rise abruptly. The size and shape of the recesses determine whether the molten resin can penetrate or not all the way into the recesses. Experimental results have revealed that, irrespective of the type of metal, the molten resin can penetrate thoroughly into recesses having a diameter not smaller than 1 μm and having a depth of 0.5 to 5 μm. When the inner wall faces of the recesses, have also a rough surface, as evidenced in the above-described microscopic observations (micrographs), the resin penetrates partly also into the crevices of these ultra-fine irregularities. As a result, the resin catches onto the irregularities and is difficult to pull away when a pulling force acts from the resin side.

Such a rough surface affords an effective spike-like catching when the surface is that of a high-hardness metal oxide. If the period of the irregularities is 10 μm or greater, the bonding force weakens for the evident reasons below. In the case of dimple-like recess aggregates, for instance, the number of dimples per surface area decreases as the diameter of the recesses becomes larger. The larger the recesses are, the smaller the catching effect of the above-mentioned spikes. Although bonding per se is a question of the resin component and the surface of the metal alloy, adding reinforcing fibers or an inorganic filler to the resin composition allows bringing the coefficient of linear expansion of the resin as a whole closer to that of the metal alloy. This allows preserving easily the bonding force after bonding. Composites obtained through injection bonding of a crystalline resin such as a PBT or PPS resin, with a magnesium alloy, copper alloy, titanium alloy, stainless steel or the like, in accordance with the above hypothesis, are strong integrated products, having a shear fracture strength of 200 to 300 kgf/cm$^2$ (about 20 to 30 N/mm$^2$=20 to 30 MPa).

The present inventors believe the "New NMT" theory to be true as borne out in injection bonding of numerous metal alloys. The advocated hypothesis, which is based on inferences relating to fundamental aspects of polymer physical chemistry, must be reviewed by many chemists and scientists. For instance, although we have freely argued about the molten crystalline resin upon rapid cooling, the question of whether the crystallization rate really drops has not been discussed heretofore from the standpoint of polymer physics. Thus, although we believe the hypothesis to be correct, the latter has not been proved true outright. Specifically, high-rate reactions at high temperature and under high pressure cannot be observed directly. The hypothesis, moreover, postulates a purely physical anchor effect underlying bonding, which deviates somewhat from conventional knowledge. Most monographs and the like concerned with adhesion and authored by specialists ordinarily ascribe chemical factors to the causes underlying adhesive forces.

Owing to the experimental difficulties involved, the inventors gave up on validating their hypothesis through direct experimentation, and decided on a reverse approach. Specifically, the inventors assumed that the "new NMT" theoretical hypothesis can be applied also to adhesive bonding, and set out to study whether high-performance adhesive phenomena can be proved by a similar theory. That is, the inventors decided to ascertain whether non-conventional bonded systems can be discovered based only on the surface state of adherend materials, and using commercially available general-purpose epoxy adhesives.

Remarkable developments have been achieved in bonding by way of adhesives. In particular, high-technology adhesives are being used in aircraft assembly. In these technologies, bonding is accomplished using high-performance adhesives, following a surface treatment in which a metal alloy is imparted corrosion resistance and microscopic texture. On closer inspection, however, metal surface treatment methods such as phosphoric acid treatment, chromate treatment and anodization rely still on staple treatment methods developed 40 or more years ago, and it seems as though no new developments have come along in recent years. As regards the development of adhesives themselves, mass production of instant adhesives took off several decades ago, and no new breakthroughs have been achieved since the landmark introduction of second-generation acrylic adhesives. From the viewpoint of adhesion theory as well, and although the inventors may not be aware of the very latest academic trends, the chemical and physical explanations jointly proffered in the commercially available monographs and the like appear to us lacking in clarity and also in ideas that may lead to further developments.

Fortunately, it is possible to use nowadays, freely and inexpensively, electron microscopes having resolutions of several nm. The inventors have discussed their "NMT" and "new NMT" hypotheses relating to injection bonding on the basis of observations of such high-resolution micrographs. As a result of the observations, the inventors eventually proposed the above-mentioned hypothesis, thoroughly based on the anchor effect. Therefore, we expected novel phenomena to be observed as a result of working on adhesion theory, in terms of adhesive bonding, by emphasizing the physical aspects. Titanium alloys have special characteristics in that, for instance, their strength is comparable to that of steels, but with a specific weight of about 4.5. Among metals in practical use, titanium alloys are thus both high-strength but lightweight metals. Titanium alloys, moreover, are resistant to salt water, and elicit very low irritability on the skin and living organisms. For this reason, titanium alloys are used not only as materials in the above-described mobile equipment such as automobiles, but also as medical materials implanted in vivo, in the form of prosthetic arms, legs, teeth, joints and the like.

The inventors began working on prototypes of outer casings for notebook computers and the like made of a PPS resin, and on plates of, for instance, titanium alloys of JIS grade I pure titanium, using injection bonding (Patent document 5) already developed. We also looked into the possibility of manufacturing similar cases for mobile electronic devices, structural members for mobile equipment, outer panel members and other parts, using now adhesives instead of injection bonding. In particular, carbon fiber reinforced plastics (hereafter, "CFRP") have the highest tensile strength among structural materials, including metals, and are ultra-lightweight, having a specific weight of 1.6 to 1.7. Lightweight and strong composite parts or structures can thus be potentially manufactured by combining composite CFRPs and lightweight titanium alloys having also light weight and high strength. CFRP prepregs are fabrics or aggregates of carbon fibers impregnated with an uncured epoxy resin. Composite formation and integration simultaneous with curing can be made simple by tweaking the affinity of CFRP prepregs and an epoxy adhesive coated on the metal.

To manufacture integrated products, therefore, we felt that first of all it was necessary to conduct diligent research and development on how to improve and stabilize bonding forces between titanium alloys and epoxy adhesives. Thus, we endeavored to develop a method that affords solid bonding with fiber-reinforced plastics (hereafter, "FRPs"), in particular CFRPs, by focusing on the development of surface treatment techniques for titanium alloys.

Patent document 1: WO 03/064150 A1

Patent document 2: WO 2004/041532 A1

Patent document 3: PCT/JP 2007/073526 (WO 2008/069252 A1)

Patent document 4: PCT/JP 2007/070205 (WO 2008/047811 A1)

Patent document 5: PCT/JP 2007/074749 (WO 2008/078714 A1)
Patent document 6: PCT/JP 2007/075287 (WO 2008/081933 A1)

DISCLOSURE OF THE INVENTION

To achieve the above goal, the present invention encompasses the aspects below.

Specifically, a titanium alloy composite of Invention 1 comprises:

a first metal part made of a titanium alloy and having micron-scale roughness produced by chemical etching, the surface thereof having, under electron microscopy at 100,000 magnifications, ultra-fine irregularities in which mountain- or mountain-range shaped projections having a height and width of 10 to 350 nm and a length of 10 nm or more are present over the entire surface at a period of 10 to 350 nm, the surface being mainly a thin layer of a titanium oxide; and another adherend that is bonded using, as an adhesive, an epoxy adhesive that penetrates into the ultra-fine irregular surface.

A titanium alloy composite of Invention 2 comprises:

a first metal part made of α-β titanium alloy and having a roughness-curve average length (RSm) of 1 to 10 μm and a maximum height roughness (Rz) of 1 to 5 μm under scanning probe microscopy, the surface thereof having fine irregularities in which both smooth dome shapes and dead leaf-like shapes are observed within a 10 μm square area under electron microscopy at 10,000 magnifications, the surface being mainly a thin layer of a metal oxide comprising titanium and aluminum; and another adherend that is bonded using, as an adhesive, an epoxy adhesive that penetrates into the surface.

A titanium alloy composite of Invention 3 is the titanium alloy composite of Invention 1 or 2, wherein the adherend is a second metal part made of a titanium alloy having the ultra-fine irregular surface formed thereon.

A titanium alloy composite of Invention 4 is the titanium alloy composite of Invention 1 or 2, wherein the adherend is a fiber-reinforced plastic, comprising the epoxy adhesive, and reinforced through filling and laminating of one or more types selected from among long fibers, short fibers and fiber cloth.

A titanium alloy composite of Invention 5 is the titanium alloy composite of Invention 1, wherein the micron-scale surface roughness has an average length (RSm) of 0.8 to 10 μm and a maximum height roughness (Rz) of 0.2 to 5 μm.

A titanium alloy composite of Invention 6 is the titanium alloy composite of Inventions 1 to 5, wherein the chemical etching involves immersion in a strongly acidic aqueous solution containing a hydrogen fluoride compound.

A titanium alloy composite of Invention 7 is the titanium alloy composite of Inventions 1 to 6, wherein the chemical etching involves immersion in an aqueous solution of ammonium bifluoride.

A titanium alloy composite of Invention 8 is the titanium alloy composite of Inventions 1 to 7, wherein a resin fraction of a cured product of the epoxy adhesive comprises no more than 30 parts by weight of an elastomer component relative to a total 100 parts by weight of resin fraction.

A titanium alloy composite of Invention 9 is the titanium alloy composite of Inventions 1 to 8, wherein a cured product of the epoxy adhesive contains a total of no more than 100 parts by weight of a filler relative to a total 100 parts by weight of resin fraction.

A titanium alloy composite of Invention 10 is the titanium alloy composite of Invention 9, wherein the filler is one or more types of reinforcing fiber selected from among glass fibers, carbon fibers and aramid fibers, or one or more types of a powder filler selected from among calcium carbonate, magnesium carbonate, silica, talc, clay and glass.

A titanium alloy composite of Invention 11 is the titanium alloy composite of Invention 8, wherein the elastomer component has a particle size of 1 to 15 μm, and is one or more types selected from among vulcanized rubber powder, semi-crosslinked rubber, unvulcanized rubber, a terminal-modified thermoplastic resin of a hydroxyl group-terminated polyether sulfone having a melting point/softening point not lower than 300° C., and a polyolefin resin.

A method for manufacturing a titanium alloy composite of Invention 12 comprises a shaping step of mechanically shaping a titanium alloy part from a casting or an intermediate material;

a chemical etching step of immersing the titanium alloy part in an aqueous solution comprising ammonium bifluoride;

a coating step of coating an epoxy adhesive on required portions of the titanium alloy part;

a shape-adjustment step of adjusting a prepreg material of fiber-reinforced plastic to the required size;

an affixing step of affixing the prepreg material of fiber-reinforced plastic to the coated surface of the titanium alloy part; and a curing step of curing an entire epoxy resin fraction by positioning, pressing and heating the prepreg material and the titanium alloy part.

A method for manufacturing a titanium alloy composite of Invention 13 comprises a shaping step of mechanically shaping a titanium alloy part from a casting or an intermediate material;

a chemical etching step of immersing the titanium alloy part in an aqueous solution comprising ammonium bifluoride, to form ultra-fine irregularities;

a coating step of coating an epoxy adhesive on required portions of the titanium alloy part;

a curing pre-treatment step of placing the titanium alloy part, having been coated with the epoxy adhesive, in an airtight vessel, depressurizing the vessel, and then pressurizing the vessel to thereby push the epoxy adhesive into the ultra-fine irregularities on the surface of the titanium alloy;

a shape-adjustment step of adjusting a prepreg material of fiber-reinforced plastic to the required size;

an affixing step of affixing the prepreg material to the coated surface of the titanium alloy part; and a curing step of curing an entire epoxy resin fraction by positioning, pressing and heating the prepreg material and the titanium alloy part.

The elements that constitute the present invention are explained in detail below, element by element.

[Titanium Alloy Part]

The titanium alloy used in the present invention is any titanium alloy, for instance a pure titanium alloy, an α titanium alloy, a β titanium alloy, an α-β titanium alloy and the like according to International Organization for Standardization (ISO), Japanese Industrial Standards (JIS) or the like. Intermediate members of titanium alloys, such as sheet, bars, pipes and the like, as well as formed products of the foregoing obtained through mechanical working such as cutting and grinding, press-working or the like, can be used in various machinery, equipment parts and structures.

[Surface Treatment of Titanium Alloy Parts]

Preferably, the titanium alloy part is immersed first in a degreasing bath to remove thereby oils and grease that become adhered during mechanical work. The degreasing agent is not a special one. Specifically, the titanium alloy part is preferably immersed in an aqueous solution prepared through addition of an ordinary degreasing agent, for instance a commercially available degreasing agent for iron, degreasing agent for stainless steel, degreasing agent for aluminum alloys, or degreasing agent for magnesium, to warm water, to a concentration as indicated by the manufacturer of the chemical. After dipping, the titanium alloy part is rinsed with water. Preferably, there is further prepared an aqueous solution of a commercially available industrial detergent, to a concentration of several % and a temperature of about 60° C., the titanium alloy part being then immersed and washed in the aqueous solution and being thereafter rinsed with water. Preferably, the titanium alloy part is subjected next to a preparatory basic washing through immersion in a basic aqueous solution followed by water rinsing.

Preferably, the titanium alloy part is chemically etched next through immersion in an aqueous solution of an acid having reducing character. Specifically, there can be used so-called reducing acids such as oxalic acid, sulfuric acid or hydrofluoric acid, which can erode the entire surface of a titanium alloy. From the viewpoint of efficiency, hydrofluoric acid affords a faster etching rate among the foregoing acids. Upon accidental contact with the human skin, however, hydrofluoric acid can penetrate deeply through the skin down to the bone, causing pain for several days. In sum, hydrofluoric acid presents problems unlike those of hydrochloric acid or the like, and is thus best avoided in terms of work environment.

A preferred acid herein is ammonium bifluoride, which is a semi-neutralized product of hydrofluoric acid and which can be handled far more safely than hydrofluoric acid. A preferred treatment method involves immersion over several minutes in an aqueous solution of about 1% of ammonium bifluoride, at a temperature of 50 to 60° C., followed by water rinsing. Chemical etching using an aqueous solution of ammonium bifluoride was carried out for obtaining micron-scale roughness (surface roughness). However, observations by electron microscopy and the latest analysis instruments have revealed that the titanium alloy surface exhibits peculiarly-shaped fine irregularities following washing and drying after chemical etching, and that the surface is covered by a thin layer of titanium oxide. In essence, it appeared that there is no need for special surface treatments, such as micro-etching or surface oxidation, which can thus be omitted.

An illustrative example follows next on the analysis of a titanium alloy etched using an aqueous solution of ammonium bifluoride, followed by washing and drying. Firstly, FIG. 8 illustrates an example of results of a scanning analysis performed using a scanning probe microscope. The results of scanning a 20 μm square rectangular surface area yielded a roughness curve average length (average length of profile curve elements) RSm of 1.8 μm and a maximum height roughness (maximum height of profile curve) Rz of 0.9μ. FIGS. 6(a) and (b) illustrates examples of electron micrographs at 10,000 magnifications and 100,000 magnifications of an alloy treated in the same way. The micrographs revealed a highly peculiar ultra-fine irregularities over the entire surface, with mountain-shaped or mountain-chain (mountain-range) shaped projections having a height and width of 10 to 300 nm and a length of 10 nm or more, at a period of 10 to 350 nm.

Large titanium and oxygen peaks in an XPS analysis clearly indicated that the compound of the surface was a titanium oxide. The hue of the surface was dark brown, indicative of a thin film of titanium (III) oxide or a mixture of titanium (III) oxide and titanium (IV) oxide. The hue before etching was metallic, and thus the surface was a native oxide layer of titanium. After etching with an aqueous solution of ammonium bifluoride, the surface turned to a dark titanium oxide layer, i.e. not a native oxide layer. The titanium oxide layer was etched 10 nm to several tens of nm using an argon ion beam, and the etched surface was analyzed by XPS. Although the XPS analysis yielded the thickness of the titanium oxide layer, this thickness was clearly thicker than that of a native oxide layer. The thickness of the titanium oxide layer in etched products of pure-titanium titanium alloys etched using an aqueous solution of ammonium bifluoride was found to be not smaller than 50 nm.

It was found also that the valence of titanium ions decreases from the surface inwards. Starting from a valence of 4, or a mixed state of valence 3 and valence 4 at the surface, the valence 2 became relatively more abundant towards the interior, and then scarcer, down to zero-valent metal. In essence, the oxide film of titanium oxide is not a simple titanium oxide layer, but a continuously changing layer in which the valence of titanium decreases continuously from the surface to reach a zero valence. In other words, the oxide film is a continuously changing layer that looks as though the layer is the result of oxygen penetrating from the surface, where oxygen is rich, into the interior, where oxygen becomes progressively scarcer. In such a metal oxide film there are no clearly defined boundaries between metal phases, and hence the bonding forces between the oxide film layer and the metal substrate is very strong, so we anticipate no concerns as regards resistance to peel breakage forces (stress).

The treatment of titanium alloys other than pure titanium alloys is accomplished using the same treatment methods as described above. However, other metals present in the alloy as small additives are reduced into insoluble products, called smut, by the nascent hydrogen gas that is generated during etching using an aqueous solution of a reducing strong acid. Most of the smut can be dissolved and removed through subsequent immersion in a several % aqueous solution of nitric acid. Silicon smut, however, merely breaks free, without dissolving in the aqueous solution of nitric acid, and thus is preferably stripped off through application of ultrasounds in water.

Compared to the above-described micrographs of FIG. 6, alloys other than pure titanium-type titanium alloys, etched with ammonium bifluoride and having smut removed therefrom, exhibit a surface morphology for which there is no straightforward description. FIGS. 7(a) and (b) illustrate micrographs of an example of an α-β titanium alloy containing aluminum. These micrographs show the sides of some clean-cut mountains and hills, lacking the fine irregularities typical of a titanium alloy (as in FIGS. 6(a) and (b)), but also peculiar shapes resembling dead leaves. The overall image of these surfaces was not an image of a fine irregular surface having a roughness period of 10 nm or more, preferably a period of 50 nm, as per condition (2) of the above-described NAT hypothesis, but rather that of a surface having a greater period, although the irregular surface itself was smooth.

Besides smooth dome-shaped portions this surface exhibits thinly curved portions shaped as dead leaves. Should these portions be hard, they would constitute the spiky shapes intended by the inventors. Although this deviates slightly from condition (2) of the above-described NAT hypothesis by the inventors, the shapes are found to have a morphology that matches the role required in condition (2). These spiky shapes are large, and thus have a bearing on the micron-scale roughness (surface roughness) of condition (1) required by NAT. Accordingly, clearly specifying also the surface roughness should afford a better comprehension. That is, the roughness as observed with a scanning probe microscope preferably involves an average length (RSm) of peaks and valleys ranging from 1 to 10 µm, and a maximum height roughness (Rz) ranging from 1 to 5 µm. The period of the fine irregularities is large, and deviates slightly from the NAT condition (2). Therefore, it is not possible to grasp an overall image of the surface based on electron micrographs at 100,000 magnifications. The surface was observed by imaging micrographs at 10,000 magnifications or less. Specifically, the surface observed by electron microscopy at 10,000 magnifications covers at least an area not smaller than 10 µm square, as illustrated in FIG. 7(a). Both smooth dome shapes and curved dead leaf-like shapes can be observed this way.

[Epoxy Resin (Adhesive) and Application Thereof]

There are excellent commercially available epoxy adhesives. Likewise, starting materials can be easily procured to produce an epoxy adhesive from scratch. Commercially available epoxy resins include, for instance, bisphenol epoxy resins, glycidylamine epoxy resins, polyfunctional polyphenol-type epoxy resins, alicyclic epoxy resins and the like. Any of these can be used as the material employed in the present invention. These epoxy resins may also be used joined to each other through reaction with a polyfunctional third component, for instance a polyfunctional oligomer having a plurality of hydroxyl groups. In the present invention, the epoxy adhesive is preferably obtained by mixing an epoxy resin with a polyfunctional amine compound added as a curing agent to the epoxy resin.

[Elastomer Component etc.]

Preferably, an elastomer component, a filler component and the like are added to the epoxy adhesive in terms of bringing the coefficient of linear expansion of the epoxy adhesive to be comparable to that of the titanium alloy and close to that of a CFRP material, and to achieve a buffer material upon application of a thermal shock. In terms of enhancing impact resistance and thermal shock resistance, the elastomer component is preferably mixed in an amount of ranging from 0 to 30 parts by weight, i.e. no more than 30 parts by weight, relative to a total 100 parts by weight of the above-described resin fraction (epoxy resin component+ curing agent component). An excess of elastomer component beyond 30 parts by weight results in a drop in bonding strength, and is hence undesirable. A vulcanized rubber powder having a particle size of 1 to 15 µm is an example of the elastomer component. Particles having a size of several µm are too large to intrude into the ultrafine irregularities on the titanium alloy during application of the adhesive. The particles remain thus in the adhesive layer and do not affect the anchor portions. As a result, there is no drop in bonding strength, while resistance to thermal shocks is an added benefit.

Although any type of vulcanized rubber can be used, in practice it is difficult to pulverize rubber to particles of several µm, regardless of rubber type. The inventors looked into the matter but found that there is little research and development being carried out on methods for manufacturing microparticle-vulcanized rubber. The inventors adopted a method that involved mechanical crushing and sorting of rubber vulcanized products, rubber unvulcanized products, and thermoplastic resins having been cooled in liquid nitrogen. Unfortunately, the manufacturing efficiency and costs associated with this method negate the commercial feasibility of the method. Another approach involves using unvulcanized or semi-crosslinked rubber, and modified super engineering plastics or polyolefin resins. Examples of modified super engineering plastics include, for instance, a hydroxyl group-terminated polyether sulfone "PES100P (by Mitsui Chemicals, Tokyo, Japan)". The polyolefin resin used is preferably an already-developed polyolefin resin that mixes readily with epoxy resins.

The inventors expect the durability against thermal shock to be inferior in unvulcanized or semi-crosslinked rubber, and modified super engineering plastics or polyolefin resins, as compared with that of powder vulcanized rubbers, although this is not yet well understood, since the evaluation method itself has not been yet fully perfected by the inventors. In any case, including unvulcanized elastomers in the mixture elicits resistance against thermal shock. Examples of such polyolefin resins include, for instance, maleic anhydride-modified ethylene copolymers, glycidyl methacrylate-modified ethylene copolymers, glycidyl ether-modified ethylene copolymers, ethylene-alkyl acrylate copolymers and the like. Examples of the maleic anhydride-modified ethylene copolymers that can be used include, for instance, maleic anhydride graft-modified ethylene copolymers, maleic anhydride-ethylene copolymers, ethylene-acrylate-maleic anhydride terpolymers and the like. Particularly preferred among the foregoing are ethylene-acrylate-maleic anhydride terpolymers, as these allow obtaining superior composites. Concrete examples of the ethylene-acrylate-maleic anhydride terpolymers include, for instance, "Bondine(trademark) by Arkema, (Paris, France)".

As the glycidyl methacrylate-modified ethylene copolymers there can be used, for instance, glycidyl methacrylate graft-modified ethylene copolymers and glycidyl methacrylate-ethylene copolymers. Particularly preferred among the foregoing are glycidyl methacrylate-ethylene copolymers, as these allow obtaining superior composites. Specific examples of the glycidyl methacrylate-ethylene copolymers include, for instance, "Bond First(trademark) by Sumitomo Chemical (Tokyo, Japan)". Examples of the glycidyl ether-modified ethylene copolymers that can be used include, for instance, glycidyl ether graft-modified ethylene copolymers and glycidyl ether-ethylene copolymers. Specific examples of the ethylene-alkyl acrylate copolymers include, for instance, "Lotryl(trademark) by Arkema".

[Filler]

The filler is explained next. Preferably, there is used an epoxy adhesive composition further containing 0 to 100 parts by weight (no more than 100 parts by weight), preferably 10 to 60 parts by weight, of a filler, relative to a total 100 parts by weight of resin fraction comprising the above-described elastomer component. Examples of the filler that is used include, for instance, a reinforcing fiber-based filler such as carbon fibers, glass fibers, aramid fibers and the like; or a powder filler such as calcium carbonate, mica, glass flakes, glass balloons, magnesium carbonate, silica, talc, clay, as well as pulverized carbon fibers and aramid fibers.

[Adjustment of the Epoxy Adhesive]

Adjustment of a specific epoxy adhesive is explained next.

An adhesive composition (uncured epoxy adhesive) is obtained by thoroughly mixing an epoxy resin main material, a curing agent, an elastomer and a filler, and as the case may require, also a small amount of a solvent (commercially available ordinary solvent) for epoxy adhesives, with a view to obtaining a desired viscosity. The adhesive composition is applied on required portions of a metal alloy part obtained in a previous process. The adhesive composition may be applied manually or using a coating machine.

[Processing after Application of the Epoxy Resin Adhesive]

After application of the epoxy resin adhesive onto the surface of the titanium alloy part, the coated part is preferably placed in a vacuum vessel or a pressure vessel. The pressure in the vessel is reduced to near vacuum. After several minutes, air is infused to revert the vessel to normal pressure. Alternatively, the coated part is placed in an environment under a pressure of several atmospheres to several tens of atmospheres. In a pressurized environment there is preferably repeated a cycle of depressurization and pressurization. Air or gas in the interstices between the coating material and the metal alloy is degassed as a result, which makes it easier for the coating material to penetrate into ultrafine recesses.

A method employing high-pressure air in a pressure vessel entails high costs in terms of equipment and expenses for actual mass production of titanium alloy composites. Therefore, carrying out one cycle, or several cycles of depressurization and return to normal pressure (atmospheric pressure) using a vacuum vessel makes for a more economic post-coating treatment method. In the case of the metal alloy of the present invention, sufficiently stable bonding strength can be achieved through several cycles of reduced and normal pressure. After being removed from the vessel, the titanium alloy composite is preferably left to stand for about 30 minutes or more in an environment at normal temperature or at a temperature of about 40° C. This allows evaporating any solvent that may have been added to the epoxy adhesive composition of the titanium alloy composite.

[FRP Prepreg]

Commercially available FRP prepregs and CFRP prepregs can be used in the invention. Examples of the commercially available prepregs include, for instance, prepregs in which the above-described epoxy resin composition is impregnated into a carbon fiber cloth, or prepregs in which a provisional film comprising uncured epoxy resin is formed and is then overlaid on a fiber cloth. The epoxy resins in the employed prepreg are often dicyandiamide-cured or amine-cured epoxy resins, and are in a B-stage (uncured state close to solid) at normal temperature. The epoxy resin melts through a rise in temperature to hundred and several tens of degrees, after which the epoxy resin becomes cured.

CFRP prepregs are explained next. Firstly there is prepared a prepreg portion through cutting to a required shape and overlaying to a required form. When using a stack of a plurality of plies of unidirectional prepreg (prepreg comprising a web weaved with substantial warp but very little weft), the directionality of the strength in the ultimately obtained CFRP sheet material can be controlled by overlaying the fiber directions of the prepreg plies and/or by overlaying the plies at an angle. Such overlaying requires therefore considerable know-how. The warp-weft counts are identical in articles obtained through weaving of carbon fibers. Equal strength in all directions is apparently found to be achieved by overlaying prepregs alternately changing the angle between plies by 45 degrees. In short, the required number of plies and the overlaying scheme are designed beforehand, and then the prepregs are cut and overlaid in accordance with the design. This completes the preparation of the prepregs.

[Method for Laminating Prepregs and Manufacturing a Composite]

The above-described FRP prepreg is laid on a titanium metal alloy part having being coated with the above-described epoxy adhesive composition. When the whole is heated in this state, the epoxy resin in the epoxy resin adhesive and in the prepreg melts once and becomes subsequently cured. To firmly bond the titanium metal alloy part and the FRP prepreg, these are heated in a compressed state against each other. Air trapped in gaps between the alloy part and the prepreg must be driven out during melting of the epoxy resin. For instance, a base is manufactured beforehand in accordance with the shape of the portion that constitutes the support face of the titanium metal alloy, on the opposite side of the bonding surface thereof. A polyethylene film is laid over the base, and then the above-described titanium alloy part is placed on the polyethylene film. The prepreg is laid on the titanium alloy part, and a further polyethylene film is laid on the prepreg. A fixing member such as structural member or the like, manufactured separately and shaped in accordance with the final prepreg shape, is placed thereon. A weight is further placed on the whole, to enable pressing and fixing during thermal curing. Briefly, a fixing jig is used for bonding the titanium alloy part and the FRP prepreg.

Obviously, the titanium alloy part and the FRP prepreg need only be cured while pressing against each other, and hence various pressing methods can be devised other than using the weight of a load. Heating is accomplished by placing the whole in a hot-air dryer or an autoclave. Ordinarily, heating is carried out at a temperature of 100 to 140° C. The adhesive component melts once and gels over about several tens of minutes. Preferably, heating proceeds then for several tens of minutes at a higher temperature of 150 to 180° C., to bring curing about. The optimal temperature conditions vary depending on the epoxy component and the curing agent component. After heating and cooling, the fixing jig is removed and the molded product is taken out. When using the above-described polyethylene films for demolding, these are likewise removed.

[Baking Jig 1]

FIG. 1 is a cross-sectional diagram of a baking jig for baking and bonding a titanium alloy plate piece and an FRP. A titanium alloy composite 10 illustrated in FIG. 2 is produced through baking of a titanium alloy plate piece 11 and a CFRP 12 using the baking jig 1, to yield an integrated product of the titanium alloy plate piece and the CFRP. The baking jig 1 is a baking fixing jig for baking the prepreg and the titanium alloy plate piece 11. A rectangular mold recess 3 is opened on the top face of a mold body 2. A mold through-hole 4 is formed in the bottom of the mold body 2.

A bottom plate projection 6 is inserted through a mold through-hole 4 in the underside of the mold bottom plate 5. The bottom plate projection 6 projects out of a mold bottom plate 7 of the mold body 2. The bottom face of the mold body 2 rests on a mold seat 8. With the mold bottom plate 5 inserted in the mold recess 3 of the mold body 2, a titanium alloy composite 10 is manufactured through baking of the titanium alloy plate piece 11 and the CFRP 12, fixed to each other as illustrated in FIG. 2, in the baking jig 1. The titanium alloy plate piece composite 10 is manufactured in accordance with the procedure outlined below.

Firstly, a demolding film 17 is laid over the entire surface of the mold bottom plate 5. Next, a titanium alloy plate piece 11 and a plate-like PTFE spacer 16 is placed on the demolding film 17. Then, 3 to 5 plies of cloth-like carbon fibers (T-300 by Toray, Tokyo, Japan) cut to a desired size and weaved, are laid on the end of the titanium alloy plate piece 11 and on the PTFE spacer 16 made of PTFE (polytetrafluoroethylene resin). A volume of about 1 cc of an uncured epoxy adhesive (EP-106) is discharged out of a syringe into a carbon fiber fabric, to impregnate the latter and produce thereby the uncured CFRP 12.

After overlaying the CFRP prepreg 12, a demolding film 13, which is a polyethylene film for demolding, is further laid on the titanium alloy plate piece 11 and the CFRP prepreg 12. Then PTFE blocks 14, 15 made of PTFE, as weights, are placed on the demolding film 13. A weight of several hundred g (not shown) is further placed, as the case may require, on the PTFE blocks 14, 15. The whole is then placed, in this state, in a baking oven, where the CFRP prepreg 12 is cured. After cooling, the weights, the seat 8 and so forth are removed, and the lower end of the bottom plate projection 6 is pushed against the floor, to remove the titanium alloy composite 10 (FIG. 2) obtained through bonding of the titanium alloy plate piece 11 and the CFRP prepreg 12, along with the demolding films 13, 17. The PTFE spacer 16 and the demolding films 17, 13 are non-adhesive materials, and can thus be easily stripped off the baked CFRP.

[Examples of Composite Use]

FIG. 3 is a single-view diagram illustrating an example of a joining method during joining of the titanium alloy-FRP composite of the present invention and a metallic structural member (L-shaped member) using bolts and nuts. A titanium alloy composite 20 is a composite that integrates a titanium alloy with a CFRP. The CFRP 21 is a plate-like structure manufactured through baking of prepreg. The L-shaped member 23 for structures is an already-manufactured structural member. Rectangular reinforcing plate materials 22 are integrally bonded to the front and rear faces of the end of the CFRP 21. The material of the reinforcing plate materials 22 is a titanium alloy. The reinforcing plate materials 22 are integrally bonded beforehand to the CFRP 21 in accordance with the above-described method.

The CFRP 21, the reinforcing plate materials 22 on the front and rear of the CFRP 21, and the angle member 23 are fixed together, by way of a washer 24 arranged on the reinforcing plate materials 22 and a washer and nut (not shown) disposed on the underside of the L-shaped member 23, in such a manner so as to be prevented from moving relative to each other by means of a bolt 25. The titanium alloy composite 20, in which the CFRP 21 is bonded to the reinforcing plate materials 22 produced from a titanium alloy, is a strong composite, having an bonding strength of 50 to 70 MPa, in terms of shear fracture strength, between the reinforcing plate materials 22 and the CFRP 21. The compressive forces exerted by the bolt 25 and the washer 24 on the reinforcing plate materials 22 are distributed effectively over the CFRP 21. In brief, only the reinforcing plate materials 22 made of titanium alloy are deformed, even when the bolt 25 and the nut are fastened to full strength, so that the CFRP 21 in the composite 20 remains undamaged. As described above, a titanium alloy and CFRP can be adhered strongly to each other in the titanium alloy composite and manufacturing method thereof of the present invention.

FIG. 5 illustrates an example of a structure using a composite plate material of CFRP and a titanium alloy plate resulting from bonding a titanium alloy plate to the front and rear faces of a flat plate-like CFRP. A composite plate material 26 has a three-layer structure in which a CFRP 27 is laminated as an interlayer, and titanium alloy plates 28 are bonded to the front and rear faces of the CFRP 27. Through-holes 29 are opened in the composite plate material 26. Bolts 30 are inserted through the through-holes 29. The bolts 30 run also through metallic L-shaped members 31, having an L-shaped cross section, disposed below the composite plate material 26. The bolts 30 are screwed into nuts (not shown). The composite plate material 26 and the L-shaped members 31 make up a single structure. The titanium alloy plates 28 are adhered to the front and rear faces of the CFRP 27, and hence the CFRP 27 is not damaged on account of, for instance, the fastening pressure exerted by the bolts 30, or through friction with the bolts 30 even if it is fastened with the bolts 30. The composite plate material 26, therefore, brings out the characteristics of both the CFRP 27 and the titanium alloy plates 28, and can thus make up a structure that is lightweight and mechanically strong.

In the titanium alloy composite of the present invention, as described above, a titanium alloy and a CFRP can be adhered strongly to each other. The titanium alloy composite is therefore both lightweight and highly strong, and can hence be used to construct bodies, chassis, parts and the like in various equipment. The titanium alloy composite can be used, for instance, as a constituent material in bodies, chassis and parts in mobile equipment such as automobiles, bicycles, mobile robots and the like. Also, the method for manufacturing a titanium alloy composite of the present invention is an easy manufacturing method since it involves only ordinary bonding and baking steps, by simply subjecting a titanium alloy to a surface treatment.

BRIEF DESCRIPTION OF THE DRAWINGS

FIGS. 6 (a), (b) are electron micrographs of a JIS grade I pure titanium piece "KS-40 (by Kobe Steel, Hyogo, Japan)" etched with an aqueous solution of ammonium bifluoride, wherein

FIGS. 7 (a), (b) are electron micrographs of an α-β titanium alloy piece "KSTI-9 (by Kobe Steel, Hyogo, Japan)" etched with an aqueous solution of ammonium bifluoride, wherein

BEST MODE FOR CARRYING OUT THE INVENTION

Figure 2:
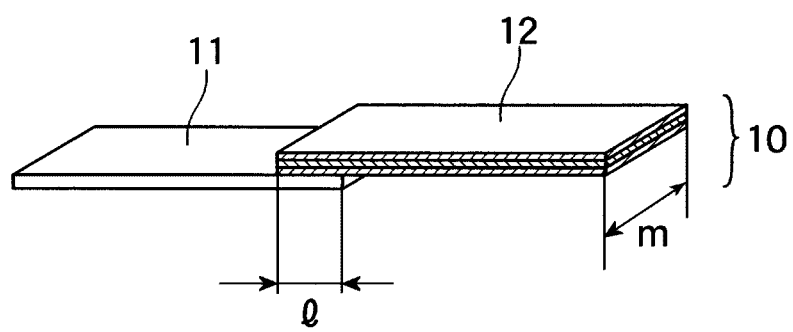
FIG. 2 is an external view diagram illustrating a test piece of a titanium alloy composite obtained by baking a titanium alloy plate piece and a CFRP.
Figure 3:
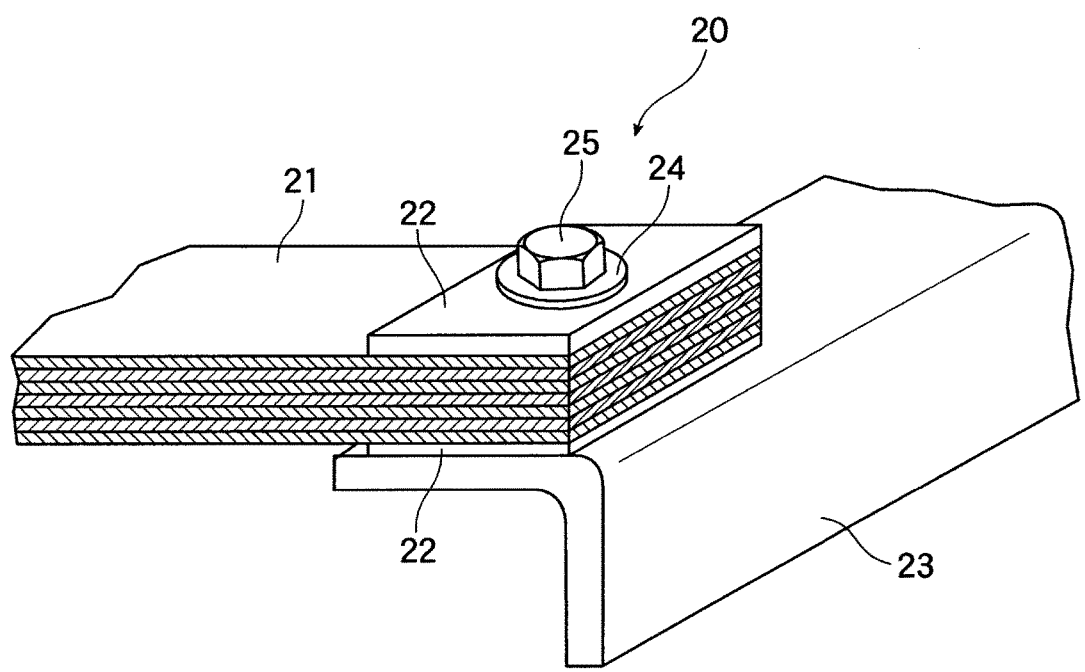
FIG. 3 is an external view diagram illustrating an example of a structure in which an integrated product of a titanium alloy plate piece and FRP is joined and fixed to a metal plate by way of bolts and nuts.
Figure 4:
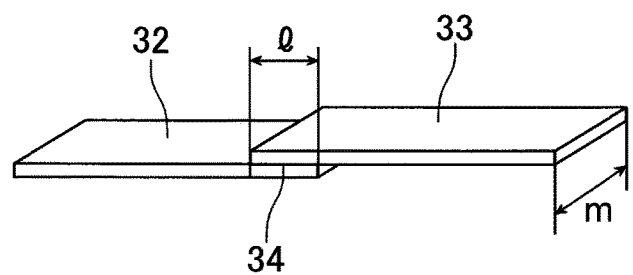
FIG. 4 is an external view diagram of a test piece for tensile fracture testing of a titanium alloy plate piece manufactured by baking a titanium alloy plate piece and a CFRP in the baking jig.
Figure 5:
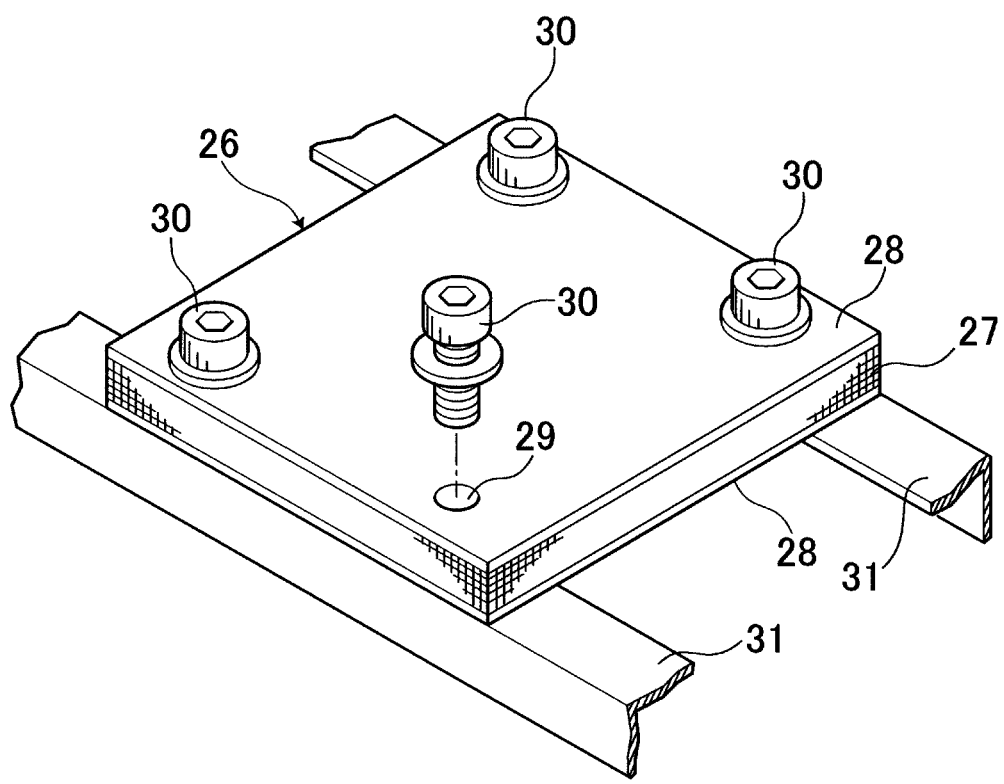
FIG. 5 is an external view diagram illustrating the appearance of an example of a structure of an integrated product in which a CFRP is sandwiched between titanium alloy plate materials.

Embodiments of the present invention are explained below based on experimental examples. FIG. 2 illustrates an example of the simplest composite structure. This structure has the standard shape of an integrated product that is also a test piece for measuring the bonding strength, in terms of shear fracture strength, between the titanium alloy and an FRP. FIG. 4 illustrates a test piece resulting from bonding two titanium alloy plate pieces 32, 33, obtained in accordance with the treatment method of the present invention, using an epoxy adhesive. The test piece is used for measuring the bonding strength between the titanium alloys. The bonding surface 34 of FIG. 4 is the adhesion surface between the two titanium alloy plate pieces 32, 33, and has an area given by m×l, as illustrated in the figure.

[Experimental Equipment Employed]

The following instruments were used for measurements and so forth in the specific working examples described below.

(a) X-Ray Surface Observation (XPS Observation)

ESCA "AXIS-Nova (by Kratos Analytical/Shimadzu (Kyoto, Japan)", was used to observe the constituent elements to a depth of 1 to 2 nm over an area of several μm across.

(b) Electron Microscopy

Observations were carried out at 1 to 2 KV using a SEM electron microscope "S-4800 (by Hitachi, Tokyo, Japan)" and "JSM-6700F (by JEOL, Tokyo, Japan)".

(c) Scanning Probe Microscopy

"SPM-9600 (by Shimadzu)" was used.

(d) X-Ray Diffractometry (XRD Observation)

"XRD6100 (by Shimadzu)" was used.

(e) Measurement of Composite Bonding Strength

A tensile tester "Model 1323 (Aikoh Engineering, Osaka, Japan" was used, to measure shear fracture strength at a pulling rate of 10 mm/minute.

[Example 1] (Titanium Alloy and Adhesive)

A 1-mm thick plate material of a commercially available titanium alloy of JIS grade I pure titanium "KS40 (by Kobe Steel, Hyogo, Japan)" was procured, and was cut into 45 mm×18 mm rectangular pieces. A degreasing aqueous solution was prepared in an dipping bath by heating, at a temperature of 60° C., an aqueous solution containing 7.5% of a commercially available degreasing agent "NE-6 (by Meltex, Tokyo, Japan)" for aluminum alloys. The titanium alloy plate material was degreased through immersion for 5 minutes in the above aqueous solution, followed by thorough rinsing with water. Next, the titanium alloy plate material was immersed for 1 minute in another dipping bath of a 1.5% aqueous solution of caustic soda at 40° C., and was rinsed with water thereafter. An aqueous solution containing 1% of ammonium bifluoride was prepared at a temperature of 60° C. The alloy pieces were immersed for 3 minutes in this aqueous solution, and were then thoroughly rinsed with deionized water. The alloy pieces were dried for 15 minutes in a warm-air dryer at a temperature of 90° C. The obtained dry titanium alloy plate pieces had a dark brown hue, devoid of metallic gloss. After drying, the titanium alloy plate material was wrapped in aluminum foil and was stored further sealed in a polyethylene bag.

Figure 6A:
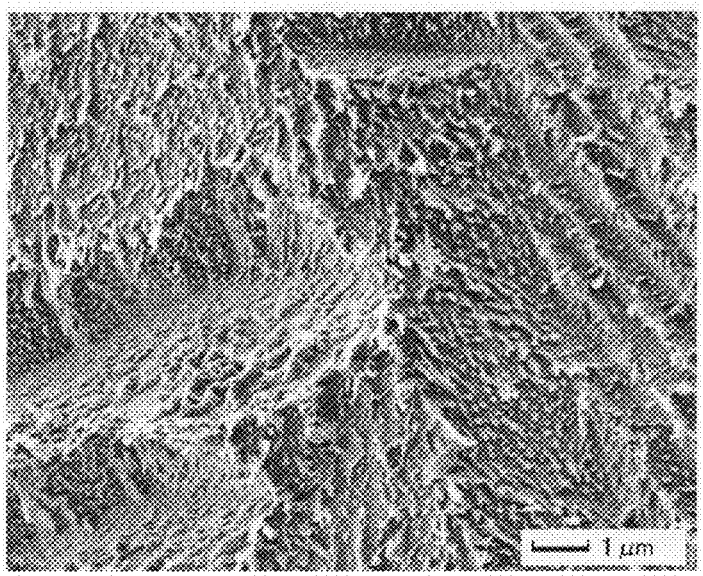
FIG. 6(a) shows 10,000 magnifications and FIG. 6(b) 100,000 magnifications.
Figure 8:
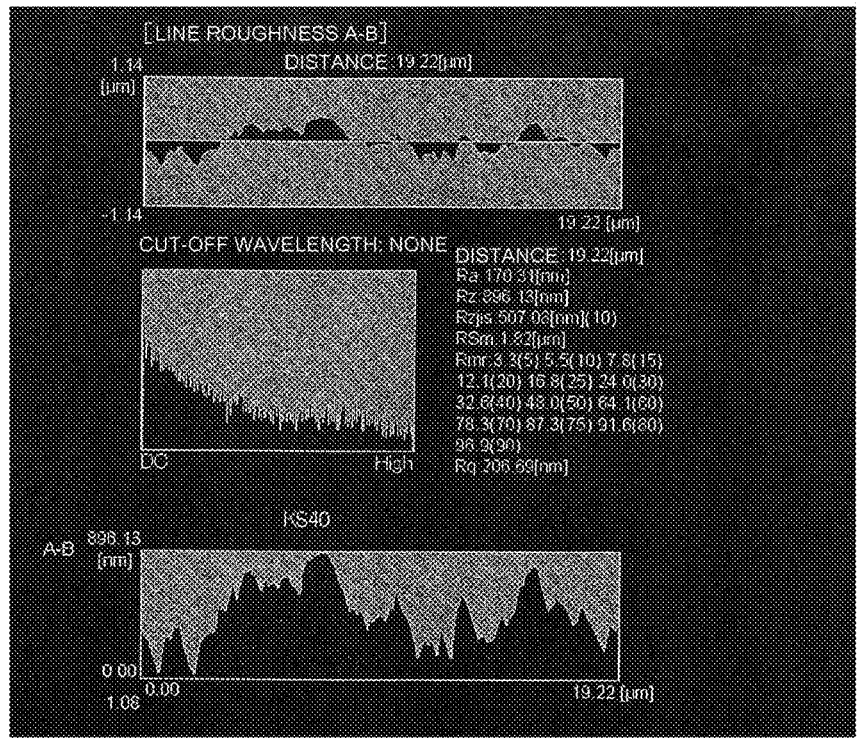
FIG. 8 illustrates roughness curves, obtained by scanning probe microscopy, of a JIS grade I pure titanium piece "KS-40 (by Kobe Steel, Hyogo, Japan)" etched with an aqueous solution of ammonium bifluoride.

Two days later, one of the pieces was observed using an electron microscope and a scanning probe microscope. FIGS. 6(a), (b) illustrate observation results using an electron microscope at 10,000 and 100,000 magnifications. The micrographs show an ultrafine irregular surface bristling with protuberances, shaped as mountains or mountain ranges, having a width and height of 10 to 300 nm, a length of 100 to several thousands of nm, and a spacing period of 10 to 350 nm. A scanning analysis performed at the same time using the scanning probe microscope revealed micron-scale roughness (surface roughness), namely an average length RSm of 1.8 μm and a maximum height roughness Rz of 0.9 μm. FIG. 8 illustrates the roughness curves obtained in that scanning. XPS analysis revealed large amounts of oxygen and titanium ions (tetra- and trivalent ions in undefined proportion), as well as small amounts of carbon, in the surface. The results of these observations indicated that the surface layer comprised titanium oxide as a main component. The dark coloration suggested the presence of a mixed oxide of titanium (III) oxide (dark violet as a simple substance) and titanium (IV) oxide (white as a simple substance).

The alloy pieces were etched about 10 nm and 100 nm using an argon ion beam, to conduct respective XPS analyses. In both cases, large amounts of oxygen were detected, and titanium ions (tetra-, tri- and divalent ions with separation between them slightly difficult) decreased rapidly with increasing depth, with growing presence of zero-valent titanium at deep portions. Small amounts of nitrogen and carbon were also observed. The above indicates that the surface comprises tetra- and trivalent titanium oxides, and that a titanium oxide layer having a lower degree of oxidation occupies a deeper portion, the latter giving way to a base of metallic titanium. The thickness of the titanium oxide layer is estimated at about 50 to 100 nm. The same analyses carried out on a stock titanium alloy (commercial titanium product as-is), before any liquid treatment, revealed a far thinner titanium oxide layer, of about 10 nm. In brief, the analyses indicate that chemical etching had the effect of increasing the thickness of the surface oxide layer without particularly eliciting any oxidation reaction.

On the same day, titanium alloy plate pieces were taken out and the ends thereof were thinly coated with a commercially available liquid one-liquid dicyandiamide-cured epoxy adhesive "EP-106 (by Cemedine, Tokyo, Japan)". The pieces were placed in a desiccator, with the coated surface facing up, and the desiccator was evacuated to 3 mmHg using a vacuum pump. One minute after evacuation, air was let in to revert the pressure to normal pressure. The operation of reverting to normal pressure after depressurization was repeated three times, and then the titanium alloy plate pieces were removed from the desiccator. The faces coated with the adhesive were stacked onto each other, over a bonding surface area therebetween of about 0.5 cm². The bonded pieces were placed in a hot-air dryer at a temperature of 135° C., where the two titanium alloy plate pieces were heated with a 300 g weight placed thereon.

After 40 minutes of heating time, the temperature setting of the hot-air dryer was changed to 165° C., to raise the temperature. Once reached, the temperature of 165° C. was kept for 20 minutes, after which the hot-air dryer was switched off. The dryer was left to cool with the door open. Two days later, the bonded pieces were subjected to a tensile fracture test. The shear fracture strength, averaged over four sets, was very high, of 51 MPa. The thickness of the integrated set was measured before the fracture test in the tensile tester, to measure the thickness of the adhesive layer. The average for the four sets was 0.12 mm. Although there were also some thick sets, of 0.15 mm, the bonding strength (shear fracture strength) thereof, at 50 MPa, was not far form the average value.

[Example 2] (Titanium Alloy and Adhesive)

A 1-mm thick plate of commercially available titanium alloy "KS40" was cut into 45 mm×18 mm rectangular pieces. A degreasing aqueous solution was prepared in an dipping bath by heating, at a temperature of 60° C., an aqueous solution containing 7.5% of a commercially available degreasing agent "NE-6 (by Meltex, Tokyo, Japan)" for aluminum alloys. The titanium alloy plate material was degreased through immersion for 5 minutes in the above aqueous solution, followed by thorough rinsing with water. Next, the titanium alloy plate material was immersed for 1 minute in another dipping bath of a 1.5% aqueous solution of caustic soda at 40° C., and was rinsed with water thereafter. An aqueous solution was prepared next by dissolving, in a separate dipping bath, 2 wt % of a commercially available general-purpose etchant containing 40% of ammonium bifluoride "KA-3 (by Metal Processing Technology Laboratory, Tokyo, Japan)", at a temperature of 60° C. The alloy pieces were immersed for 3 minutes in this aqueous solution, and were then thoroughly rinsed with deionized water. The pieces were dried for 15 minutes in a warm-air dryer at a temperature of 90° C. The obtained titanium alloy plate pieces had a dark brown hue, devoid of metallic gloss. After drying, the titanium alloy plate material was wrapped in aluminum foil and was stored further sealed in a polyethylene bag.

Two days later, one of the pieces was observed under an electron microscope and a scanning probe microscope. The piece was observed at 100,000 magnifications under an electron microscope. The aspect of the piece bore a close resemblance to the electron micrograph 1 of Experimental example 1. The roughness (surface roughness) observed by scanning probe microscopy exhibited for the most part a roughness period of 1 to 10 μm and a profile height difference of 0.5 to 2 μm. On the same day, titanium alloy plate pieces were taken out and the ends thereof were thinly coated with a commercially available liquid one-liquid dicyandiamide-cured epoxy adhesive "EP-106 (by Cemedine, Tokyo, Japan)". The pieces were placed in a desiccator, with the coated surface facing up, and the desiccator was evacuated to 3 mmHg using a vacuum pump. One minute after evacuation, air was let in to revert the pressure to normal pressure (atmospheric pressure).

The operation of reverting to normal pressure after depressurization was repeated three times, and then the titanium alloy plate pieces were removed from the desiccator. The faces coated with the adhesive were stacked onto each other, over a bonding surface area therebetween of about 0.5 cm². The bonded pieces were placed in a hot-air dryer at a temperature of 135° C., where the two titanium alloy plate pieces were heated with a 300 g weight placed thereon. After 40 minutes of heating time, the temperature setting of the hot-air dryer was changed to 165° C., to raise the temperature. Once reached, the temperature of 165° C. was kept for 20 minutes, after which the hot-air dryer was switched off. The dryer was left to cool with the door open. Two days later, the bonded pieces were subjected to a tensile fracture test. The shear fracture strength, averaged over four sets, was very high, of 63 MPa.

[Example 3] (Titanium Alloy and Adhesive)

A 1-mm thick plate material of a commercially available titanium alloy of α-β titanium alloy "KSTI-9 (by Kobe Steel, Hogyo, Japan)" was procured, and was cut into 45 mm×18 mm rectangular pieces. A degreasing aqueous solution was prepared in an dipping bath by heating, at a temperature of 60° C., an aqueous solution containing 7.5% of a commercially available degreasing agent "NE-6 (by Meltex, Tokyo, Japan)" for aluminum alloys. The titanium alloy plate material was degreased through immersion for 5 minutes in the above aqueous solution, followed by thorough rinsing with water. Next, the titanium alloy plate material was immersed for 1 minute in another dipping bath of a 1.5% aqueous solution of caustic soda at 40° C., and was rinsed with water thereafter. An aqueous solution was prepared next by dissolving, in a separate dipping bath, 2 wt % of a commercially available general-purpose etchant containing 40% of ammonium bifluoride "KA-3 (by Metal Processing Technology Laboratory, Tokyo, Japan)", at a temperature of 60° C. The alloy pieces were immersed for 3 minutes in this aqueous solution, and were then thoroughly rinsed with deionized water.

Figure 6B:
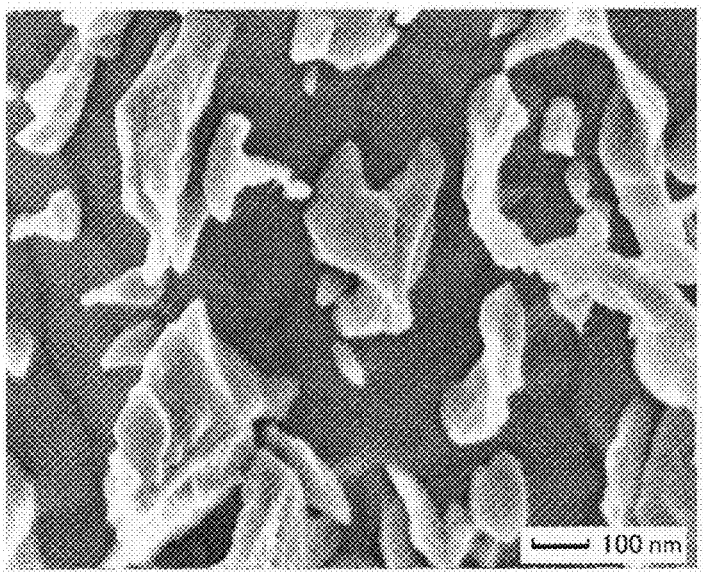
Figure 7A:
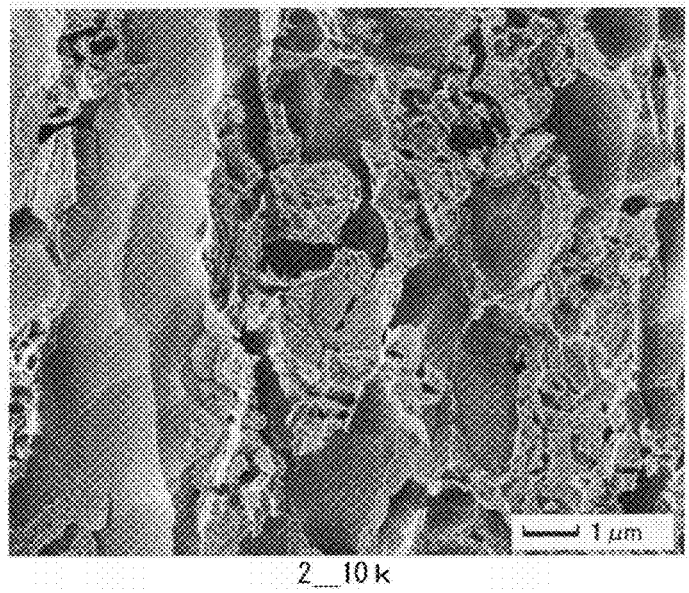
FIG. 7(a) shows 10,000 magnifications and FIG. 7(b) 100,000 magnifications.
Figure 7B:
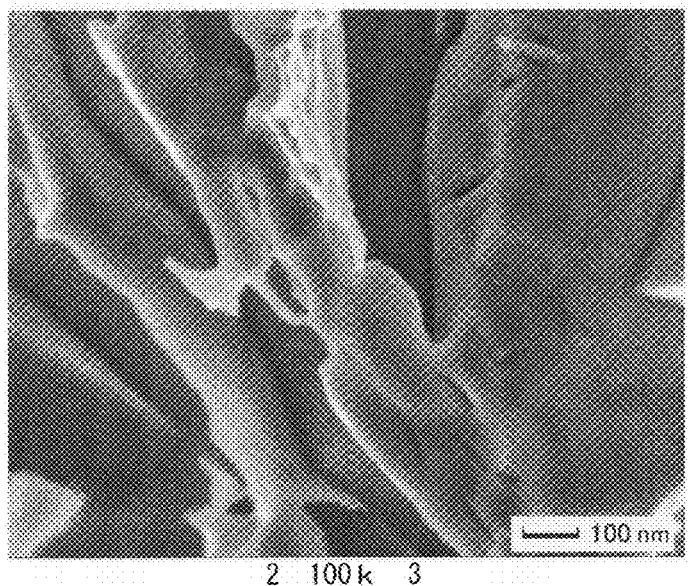
Figure 9:
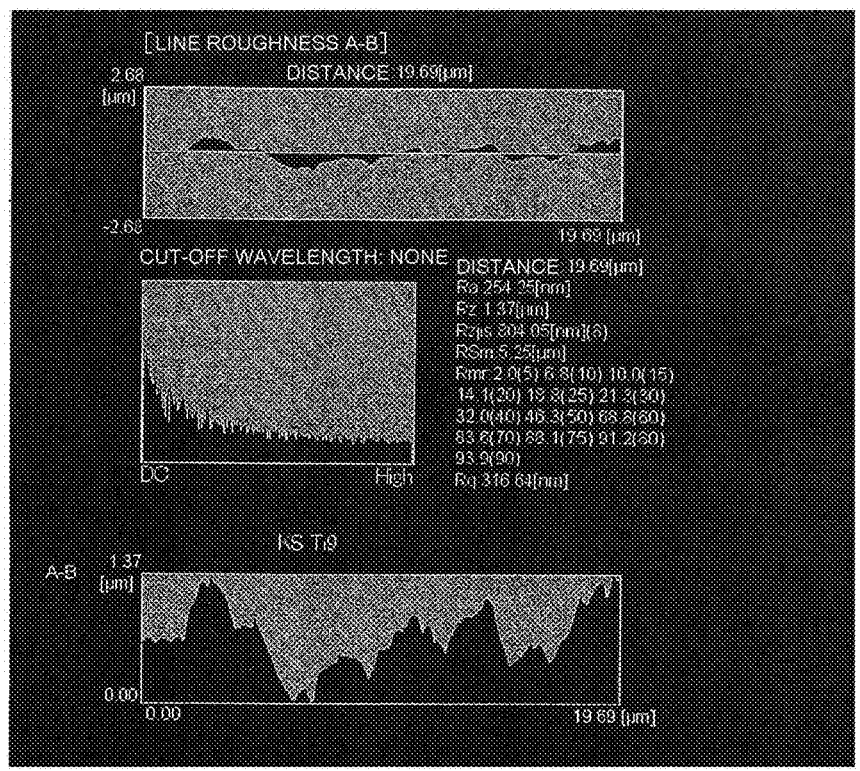
FIG. 9 illustrates roughness curves, obtained by scanning probe microscopy, of an α-β titanium alloy piece "KSTI-9 (by Kobe Steel, Hyogo, Japan)" etched with an aqueous solution of ammonium bifluoride.

Some black smut was adhered to the surface of the titanium alloy plate material. Therefore, the titanium alloy plate material was immersed for 3 minutes in a 3% aqueous solution of nitric acid at 40° C., and was then immersed for 5 minutes in deionized water under application of ultrasounds, to remove the smut. The titanium alloy plate material was immersed again in the 3% nitric acid aqueous solution for 0.5 minutes, and was rinsed then with water. The pieces were dried for 15 minutes in a warm-air dryer at a temperature of 90° C. The obtained titanium alloy plate pieces had a dark brown hue, devoid of metallic gloss. After drying, the titanium alloy plate material was wrapped in aluminum foil and was stored further sealed in a polyethylene bag. Two days later, one of the pieces was observed under an electron microscope and a scanning probe microscope. FIGS. 7(*a*), (*b*) illustrate observation results using an electron microscope at 10,000 and 100,000 magnifications. The micrographs showed portions closely resembling the electron micrographs observed in Experimental example 1 (micrographs in FIG. 6), and also substantial dead leaf-like portions having no straightforward morphological description. A scanning analysis using a scanning probe microscope revealed micron-scale roughness (surface roughness), namely a roughness curve average length RSm of 5.3 μm and a maximum height roughness Rz of 1.4 μm. The obtained curve diagrams are illustrated in FIG. 9.

On the same day, titanium alloy plate pieces were taken out and the ends thereof were thinly coated with a commercially available liquid one-liquid dicyandiamide-cured epoxy adhesive "EP-106 (by Cemedine, Tokyo, Japan)". The pieces were placed in a desiccator, with the coated surface facing up, and the desiccator was evacuated to 3 mmHg using a vacuum pump. One minute after evacuation, air was let in to revert the pressure to normal pressure (atmospheric pressure). The operation of reverting to normal pressure after depressurization was repeated three times, and then the titanium alloy plate pieces were removed from the desiccator. The faces coated with the adhesive were stacked onto each other, over a bonding surface area therebetween of about 0.5 cm². The bonded pieces were placed in a hot-air dryer at a temperature of 135° C., where the two titanium alloy plate pieces were heated with a 300 g weight placed thereon. After 40 minutes of heating time, the temperature setting of the hot-air dryer was changed to 165° C., to raise the temperature. Once reached, the temperature of 165° C. was kept for 20 minutes, after which the hot-air dryer was switched off. The dryer was left to cool with the door open. Two days later, the bonded pieces were subjected to a tensile fracture test. The shear fracture strength, averaged over four sets, was very high, of 60 MPa.

[Experimental Example 4] (Adhesive)

A commercially available liquid one-liquid dicyandiamide-cured epoxy adhesive "EP-106 (by Cemedine, Tokyo, Japan)" was procured. An ethylene-acrylate-maleic anhydride terpolymer "Bondine TX8030 by Arkema", as a polyolefin resin, was procured, was frozen at liquid-nitrogen temperature, and was crushed to yield a 30 μm mesh-pass powder. Glass fibers having an average fiber diameter of 9 μm and fiber length of 3 mm "RES03-TP91 (by Nippon Sheet Glass)" were procured and finely ground in a mortar. A polyethylene beaker was charged with 100 g of an epoxy adhesive "EP-106", 5 g of the above powdered polyolefin resin, and 10 g of the above glass fibers. The whole was thoroughly stirred and left to stand for 1 hour, followed by renewed stirring to elicit thorough blending. The resulting blend was the epoxy adhesive. Tests were then performed in exactly the same way as in Experimental example 2, but using herein the obtained adhesive composition instead of "EP-106". Two days after adhesive curing, the bonded pieces were subjected to a tensile fracture test. The shear fracture strength, averaged over four sets, was of 55 MPa.

[Experimental Example 5] (Adhesive)

A commercially available epoxy adhesive "EP-106" was procured. A glycidyl methacrylate-ethylene copolymer "Bond First E (by Sumitomo Chemical)", as a polyolefin resin, was procured, was frozen at liquid-nitrogen temperature, and was crushed to yield a 30 μm mesh-pass powder. A polyethylene beaker was charged with 100 g of an epoxy adhesive "EP-106", 5 g of the above powdered polyolefin resin, and 10 g of glass fibers "RES03-TP91". The whole was thoroughly stirred and left to stand for 1 hour, followed by renewed stirring to elicit thorough blending. The resulting blend was the epoxy adhesive. Tests were then performed in exactly the same way as in Experimental example 2, but using herein the obtained adhesive composition instead of "EP-106". Two days after adhesive curing, the bonded pieces were subjected to a tensile fracture test. The shear fracture strength, averaged over four sets, was of 52 MPa.

In the light of the present experimental example and experimental examples 2 and 3, it is evident that the magnitude of the basic bonding strength is determined by the shape and characteristics of the metal surface. The fact that the results of the present experimental example and experimental examples 2 and 3 were substantially identical suggested that the prerequisite basic performance of the adhesive itself, "EP-106", did not change in these experimental examples. The adhesive in the experimental examples actually comprised an elastomer. Also, the coefficient of linear expansion of the adhesive was expected to be close to that of metals, on account of the filler that was blended in. Therefore, conventional knowledge among practitioners at the forefront of adhesive science suggested that good results were to be expected upon exposure to vibration and high temperature.

[Experimental Example 6] (Preparation of Commercial-Type Prepreg)

Prepreg is a sheet-like intermediate material for molding, comprising a cloth of carbon, glass or the like impregnated with a thermosetting resin. Upon thermal curing, prepregs yield lightweight and strong fiber-reinforced plastics (hereafter, "FRPs"). In experimental example 9, a thermosetting resin as given in Table 1 was prepared for producing such a prepreg.

TABLE 1

| Thermosetting resin for prepreg | | |
|---|---|---|
| Resin fraction | | Proportion (parts by weight) |
| Epoxy resin | Brominated bisphenol A solid epoxy resin "EPC-152 by Dainippon Ink & Chemicals)" | 10.0 |
| | Bisphenol A liquid epoxy resin "EP-828 (by Yuka-Shell Epoxy)" | 13.9 |
| | Bisphenol F liquid epoxy resin "EPC-830 (by Dainippon Ink & Chemicals)" | 24.8 |
| Elastomer | Weakly crosslinked carboxyl-terminated solid acrylonitrile butadiene rubber "DN-611 (by Zeon Corporation)" | 8.0 |
| | Thermoplastic hydroxyl-terminated polyether sulfone "PES-100P (by Mitsui Toatsu Chemicals)" | 3.0 |
| Curing agent | | |
| Tetraglycidyldiaminodiphenylmethane "ELM-434 (by Sumitomo Chemical)" | | 15.0 |
| 4,4'-diaminodiphenyl sulfone "4,4'-DDS (by Sumitomo Chemical)" | | 25.0 |
| $BF_3$-monoethylamine complex "$BF_3$•MEA" | | 0.3 |
| Total | | 100.0 |

The thermosetting resin comprising the components of Table 1 was mixed at normal temperature and was rolled into a sheet shape. The obtained thermosetting resin film was set in a prepreg machine, and was pressure-bonded from both sides of unidirectionally aligned carbon fibers "T-300 (by Toray)", as reinforcing fibers, under application of pressure in accordance with known methods, to prepare a prepreg having a resin content of 38% and a fiber areal weight of 190 g/m$^2$.

[Experimental Example 7] (Production and Evaluation of a Composite)

A 1.0 mm-thick "KS40" titanium alloy plate material was cut into rectangular 45 mm×15 mm pieces. The pieces were subjected to a liquid treatment in exactly the same way as in experimental example 2. That is, the titanium alloy plate material was degreased using an aqueous solution of a degreasing agent for aluminum alloys "NE-6". The titanium alloy plate material was rinsed with water, and was subjected to a preliminary basic washing using a 1.5% aqueous solution of caustic soda, followed by water rinsing. The titanium alloy plate material was chemically etched next with a 2% aqueous solution of a commercially available general-purpose etchant "KA-3", followed by water rinsing. Thereafter, the titanium alloy plate material was dried for 15 minutes in a warm-air dryer at a temperature of 90° C.

After drying, the titanium alloy plate material was wrapped in aluminum foil and was stored. On the same day, titanium alloy plate pieces were taken out and the ends thereof were thinly coated with a commercially available liquid one-liquid dicyandiamide-cured epoxy adhesive "EP-106 (by Cemedine)". The pieces were placed in a desiccator, with the coated surface facing up, and the desiccator was evacuated to 3 mmHg using a vacuum pump. One minute after evacuation, air was let in to revert the pressure to normal pressure (atmospheric pressure). The operation of reverting to normal pressure after depressurization was repeated three times, and then the titanium alloy plate pieces were removed from the desiccator.

Figure 1:
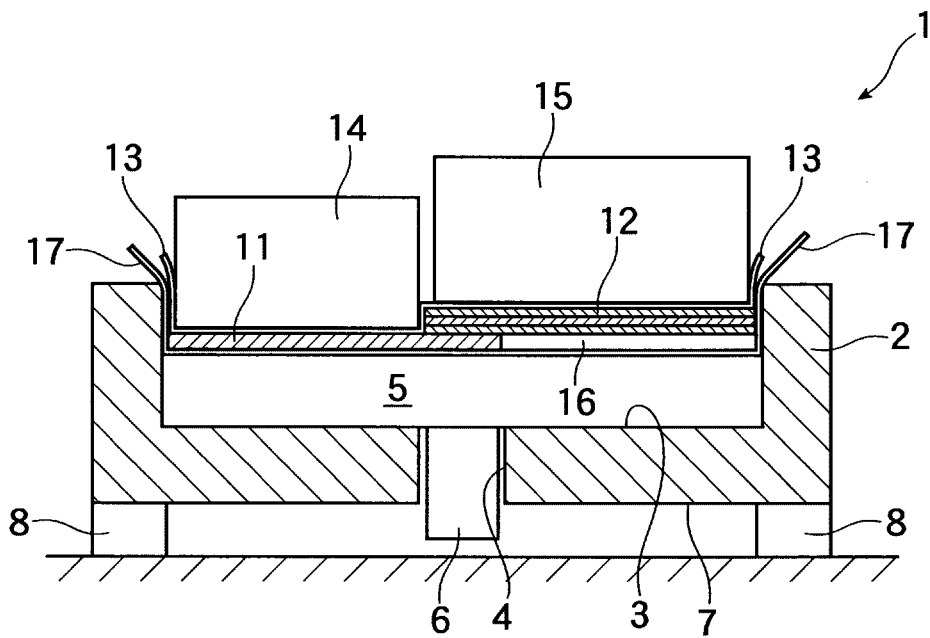
FIG. 1 is a cross-sectional diagram of a baking jig for baking and bonding a titanium alloy plate piece and an FRP.

The baking jig 1 illustrated in FIG. 1 is used in accordance with the above-described method. A 0.05 mm polyethylene demolding film 17 was laid in the baking jig 1, and the above-described titanium alloy plate piece 11 and PTFE spacer 16 were placed thereon. A weaved cloth of carbon fibers "T-300 (by Toray)", cut separately, was overlaid by stacking three plies thereof while applying thereto an epoxy adhesive "EP-106" discharged out of a syringe. Next, a polyethylene demolding film 13 was placed on top of the titanium alloy plate piece 11. The liquid one-liquid dicyandiamide-cured epoxy adhesive "EP-106" was used in an amount of about 1 cc.

PTFE pressing blocks 14, 15 were placed, and the whole was moved into a hot-air dryer. In the hot-air dryer, 0.5 kg iron weights were further placed on the PTE blocks 14, 15, respectively. The dryer was energized to raise the temperature to 135° C. The temperature was set at 135° C., and heating proceeded for 40 minutes. After a break of 5 minutes, the temperature was raised to 165° C., and was held there for 20 minutes. The dryer was then powered off and was left to cool with the door open. On the next day, the baking mold jig 1 was removed from the dryer and the molded product was demolded from the baking mold jig 1. The polyethylene films were stripped off to yield the titanium alloy composite 10 illustrated in FIG. 2. The same operation was repeated to obtain eight integrated products of a composite of the titanium alloy plate piece 11 and the CFRP 12.

On the second day after bonding, four integrated bodies were subjected to a tensile shear test. The CFRP portion was sandwiched between two pieces of sandpaper-roughened 1 mm-thick SUS304 stainless steel pieces. The resulting stack was clamped and fixed between chuck plates. The average shear fracture strength for four sets was very high, of 61 MPa. The bonding surface area was calculated as 1×m, as in FIG. 2. The remaining four integrated bodies were clamped in the tensile tester in the same way as above, and were loaded up to about 30 MPa, whereupon pulling was discontinued. After 10 minutes, the chuck was then loosened and the pieces were removed from the tester and left to stand. On the next day, the pieces were subjected to a tensile fracture test that yielded an average result of 60 MPa, i.e. no particular drop in bonding strength was observed.

[Experimental Example 8] (Production and Evaluation of a Composite)

As in experimental example 3, a 1.0 mm-thick commercially available α-β titanium alloy "KSTI-9 (by Kobe Steel, Hogyo, Japan)" plate material was cut into 45 mm×18 mm rectangular pieces, to prepare test pieces for measurement of bonding strength in the same way as above. That is, an adhesive was coated onto the titanium alloy, the titanium alloy was placed in a desiccator that was repeatedly evacuated using a vacuum pump and reverted again to normal pressure (atmospheric pressure), three times, to prepare adhesive-coated titanium alloy plate pieces. A baking jig 1 for baking, illustrated in FIG. 1, was prepared next. A demolding film 17, resulting from cutting a 0.05 mm-thick polyethylene film into strips, was laid over the entire surface of the mold bottom plate 5. The titanium alloy plate piece 11 was then placed on the demolding film 17. The operation thus far was identical to that of experimental example 7, except that the used CFRP prepreg was the prepreg produced in experimental example 6.

That is, 3 plies of the cut prepreg of experimental example 6 were overlaid, and then a polyethylene demolding film 13 was laid on top of the titanium alloy. PTFE pressing blocks 14, 15 were then placed, and the whole was moved into a hot-air dryer. In the hot-air dryer, 0.5 kg iron weights were further placed on the pressing blocks 14, 15, respectively. The dryer was energized to raise the temperature to 135° C. The temperature was set at 135° C., and heating proceeded for 60 minutes. After a break of 10 minutes, the temperature was raised to 170° C., and was held there for 40 minutes. The dryer was then powered off and was left to cool with the door open. On the next day, the baking jig 1 was removed from the dryer and the molded product was demolded from the baking jig 1. The polyethylene films were stripped off to yield the titanium alloy 10 illustrated in FIG. 2.

A tensile shear test was carried out on the second day after bonding. The CFRP portion was sandwiched between two pieces of sandpaper-roughened 1 mm-thick SUS304 stainless steel. The resulting stack was clamped and fixed between chuck plates. The average shear fracture strength for four sets was very high, of 55 MPa. The bonding surface area was calculated as 1×m, as in FIG. 2.

[Experimental Example 9] (Titanium Alloy and Adhesive)

A 1-mm thick commercially available α-β titanium alloy "KSTI-9 (by Kobe Steel, Hogyo, Japan)" plate material was cut into 45 mm×18 mm rectangular pieces. A degreasing aqueous solution was prepared in an dipping bath by heating, at a temperature of 60° C., an aqueous solution containing 7.5% of a commercially available degreasing agent "NE-6 (by Meltex, Tokyo, Japan)" for aluminum alloys. The titanium alloy plate material was immersed for 5 minutes in this degreasing aqueous solution, and was then thoroughly rinsed with water. Next, the titanium alloy plate material was immersed for 1 minute in another dipping bath of a 1.5% aqueous solution of caustic soda at 40° C., and was rinsed with water thereafter.

An aqueous solution was prepared next by dissolving, in a separate dipping bath, 2 wt % of a commercially available general-purpose etchant containing 40% of ammonium bifluoride "KA-3 (by Metal Processing Technology Laboratory, Tokyo, Japan)", at a temperature of 60° C. The titanium alloy pieces were immersed for 5 minutes in this aqueous solution, and were then thoroughly rinsed with deionized water. Some black smut was adhered to the surface of the titanium alloy pieces. Therefore, the titanium alloy pieces were immersed for 1 minute in a 5% aqueous solution of oxalic acid at 40° C., and were rinsed with water thereafter. The pieces were dried for 15 minutes in a warm-air dryer at a temperature of 90° C. The obtained dry titanium alloy plate pieces had a dark brown hue, devoid of metallic gloss. After drying, the titanium alloy plate material was wrapped in aluminum foil and was stored further sealed in a polyethylene bag.

On the same day, titanium alloy plate pieces were taken out and the ends thereof were thinly coated with a commercially available liquid one-liquid dicyandiamide-cured epoxy adhesive "EP-106 (by Cemedine, Tokyo, Japan)". The pieces were placed in a desiccator, with the coated surface facing up, and the desiccator was evacuated to 3 mmHg using a vacuum pump. One minute after evacuation, air was let in to revert the pressure to normal pressure (atmospheric pressure). The operation of reverting to normal pressure after depressurization was repeated three times, and then the titanium alloy plate pieces were removed from the desiccator. The faces coated with the adhesive were stacked onto each other, over a bonding surface area therebetween of about 0.5 cm². The bonded pieces were placed in a hot-air dryer at a temperature of 135° C., where the two titanium alloy plate pieces were heated with a 300 g weight placed thereon. After heat-drying at 135° C., the temperature setting of the hot-air dryer was changed, 40 minutes later, to 165° C., to raise the temperature. Once reached, the temperature of 165° C. was kept for 20 minutes, after which the hot-air dryer was switched off. The dryer was left to cool with the door open. Two days later, the bonded pieces were subjected to a tensile fracture test. The shear fracture strength, averaged over four sets, was very high, of 62 MPa.

[Experimental Example 10] (Titanium Alloy and Adhesive: Comparative Example)

The same 1 mm-thick titanium alloy "KS40" plate material of experimental example 1 was used, but lightly abraded first with #1000 sandpaper. The plate material was then cut into 45 mm×18 mm rectangular pieces. A degreasing aqueous solution was prepared in an dipping bath by heating, at a temperature of 60° C., an aqueous solution containing 7.5% of a commercially available degreasing agent "NE-6 (by Meltex, Tokyo, Japan)" for aluminum alloys. The titanium alloy plate material was degreased through immersion for 5 minutes in the above aqueous solution, followed by thorough rinsing with water. Next, the titanium alloy plate material was immersed for 1 minute in another dipping bath, having an 1.5% aqueous solution of caustic soda at 40° C.

An aqueous solution containing 0.4% of ammonium bifluoride at a temperature of 40° C. was prepared next. The alloy pieces were dipped for 15 seconds in this aqueous solution, and were then thoroughly rinsed with deionized water. The pieces were dried for 15 minutes in a warm-air dryer at a temperature of 90° C. The obtained titanium alloy plate pieces had less metallic gloss than initially, but retained a metallic feel, and were thus unlike those of experimental example 1. After drying, the titanium alloy plate material was wrapped in aluminum foil and was stored further sealed in a polyethylene bag. Later, one of the pieces was observed using an electron microscope. The aspect of the pieces did not differ significantly from that of FIG. 6. Scanning probe microscope observation, however, revealed an average length RSm of 13.5 μm and a maximum height roughness Rz of 2.5 μm, over six scan analyses. Such a roughness period was too large for the roughness to be regarded as of micron scale.

Thereafter, the titanium alloy pieces were adhered to each other using the epoxy adhesive "EP106", followed by curing and by a tensile fracture test, in exactly the same way as in experimental example 1. The average bonding strength (shear fracture strength) of four sets was no greater than 19 MPa, i.e. far weaker than that of experimental example 1.

The invention claimed is:

1. A titanium alloy composite, comprising:
a first metal part made of a titanium alloy and having micron-scale surface roughness produced by treatment comprising chemical etching with an average length (RSm) of 0.8 to 10 μm and a maximum height (Rz) of 0.2 to 5 μm, said surface thereof having, under electron microscopy at 100,000 magnifications, ultra-fine irregularities in which mountain or mountain-range shaped projections having a height and width of 10 to 350 nm and a length of 10 nm or more are present over the entire surface at a period of 10 to 350 nm and said surface thereof comprising a thin layer with a thickness of 50 to 100 nm of a titanium oxide, and another adherend that is bonded to the first metal part using, as an adhesive, a one-part epoxy adhesive;
wherein said treatment comprising chemical etching is performed by immersing the first metal part in an aqueous solution containing ammonium hydrogen difluoride in a concentration of 0.8 to 1 mass % and at a temperature of 50 to 60° C. for 2 to 3 minutes, then rinsing with water and drying,
said another adherend is a fiber-reinforced plastic, comprising said epoxy adhesive and reinforced by filling or laminating at least one member selected from fiber and fiber cloth,
bonding of the another adherend to the first metal part is performed with the one-part epoxy adhesive having penetrated into the ultra-fine irregular surface, and
said titanium alloy composite has a shear fracture strength at a pulling rate of 10 mm/minute of 50 to 60 MPa.

2. A titanium alloy composite, comprising:
a first metal part made of α-β titanium alloy and having surface configuration produced by treatment comprising chemical etching with a surface roughness curve average length (RSm) of 1 to 10 μm and a maximum height roughness (Rz) of 1 to 5 μm under scanning probe microscopy, said surface thereof having ultra-fine irregularities in which both smooth dome shapes and curved portion shapes are observed within a 10 μm square area under electron microscopy at 10,000 magnifications and said surface thereof comprising a thin layer with a thickness of 50 to 100 nm of a metal oxide comprising titanium and aluminum, and
another adherend that is bonded to the first metal part using, as an adhesive, a one-part epoxy adhesive,
wherein said treatment comprising chemical etching is performed by immersing the first metal part in an aqueous solution containing ammonium hydrogen difluoride in a concentration of 0.8 to 1 mass % and at a temperature of 50 to 60° C. for 2 to 3 minutes, then rinsing the same with water and drying the same,
said another adherend is a fiber-reinforced plastic, comprising said epoxy adhesive and reinforced by filling or laminating at least one member selected from fiber and fiber cloth,
bonding of the another adherend to the first metal part is performed with the one-part epoxy adhesive having penetrated into the ultra-fine irregular surface, and
said titanium alloy composite has a shear fracture strength at a pulling rate of 10 mm/minute of 50 to 60 MPa.

3. The titanium alloy composite according to claim 1 or 2, wherein a resin fraction of a cured product of said epoxy adhesive comprises no more than 30 parts by weight of an elastomer component relative to a total 100 parts by weight of a sum of epoxy resin component and curing agent component as resin fraction.

4. The titanium alloy composite according to claim 3, wherein said epoxy adhesive further comprises up to 100 parts by weight of a filler based on 100 parts by weight of a sum of the resin fraction comprising the elastomer component after curing.

5. The titanium alloy composite according to claim 4, wherein said filler is at least one reinforcing fiber selected from the group consisting of glass fibers, carbon fibers and aramid fibers, or
at least one powder filler selected from the group consisting of calcium carbonate, magnesium carbonate, silica, talc, clay and glass.

6. The titanium alloy composite according to claim 3, wherein said elastomer component has a particle size of 1 to 15 μm, and is at least one member selected from the group consisting of vulcanized rubber powder, semi-crosslinked rubber, unvulcanized rubber, a terminal-modified thermoplastic resin of a hydroxyl group-terminated polyether sulfone having a melting point/softening point not lower than 300° C., and a polyolefin resin.

* * * * *